Jan. 6, 1942.                          H. THIES                         2,269,348
                                   TRACTOR WOOD SAW
                                Filed June 29, 1940                5 Sheets-Sheet 1
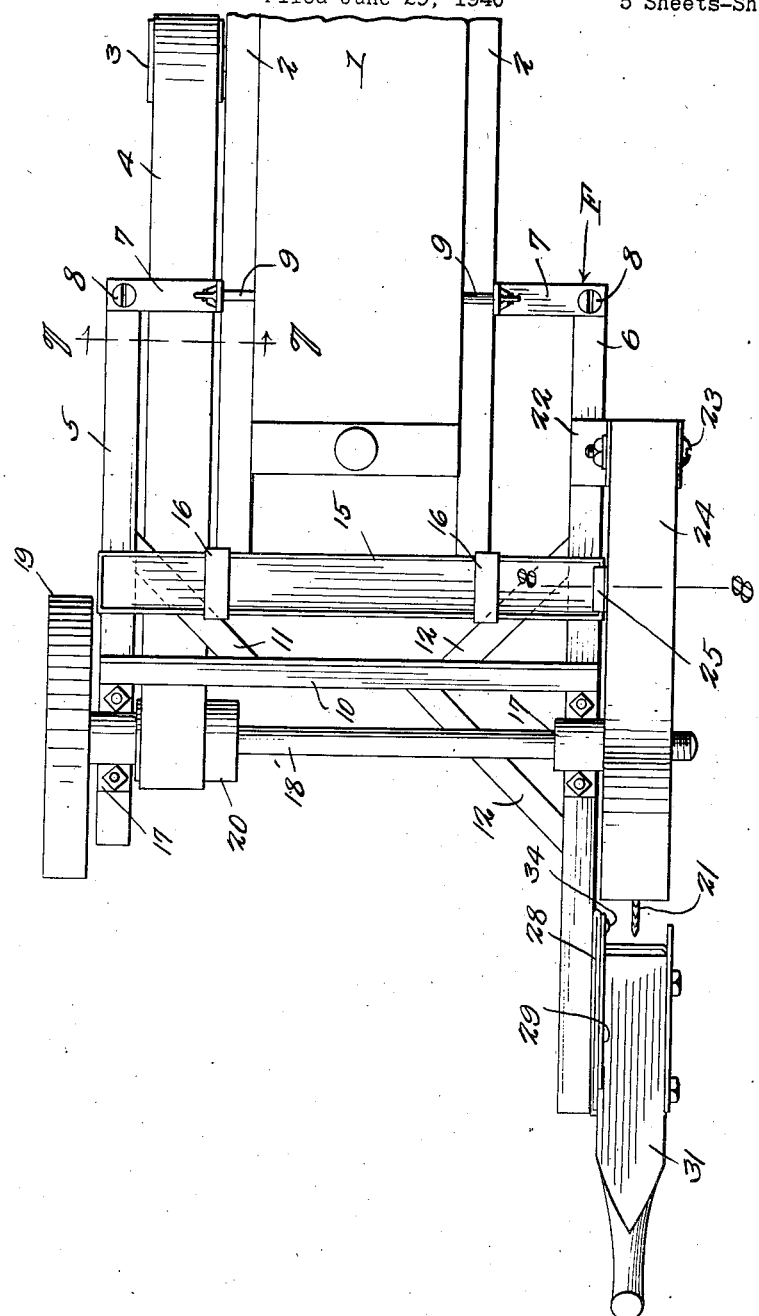
Howard Thies, INVENTOR.
BY *Snow&Co.*
ATTORNEYS.

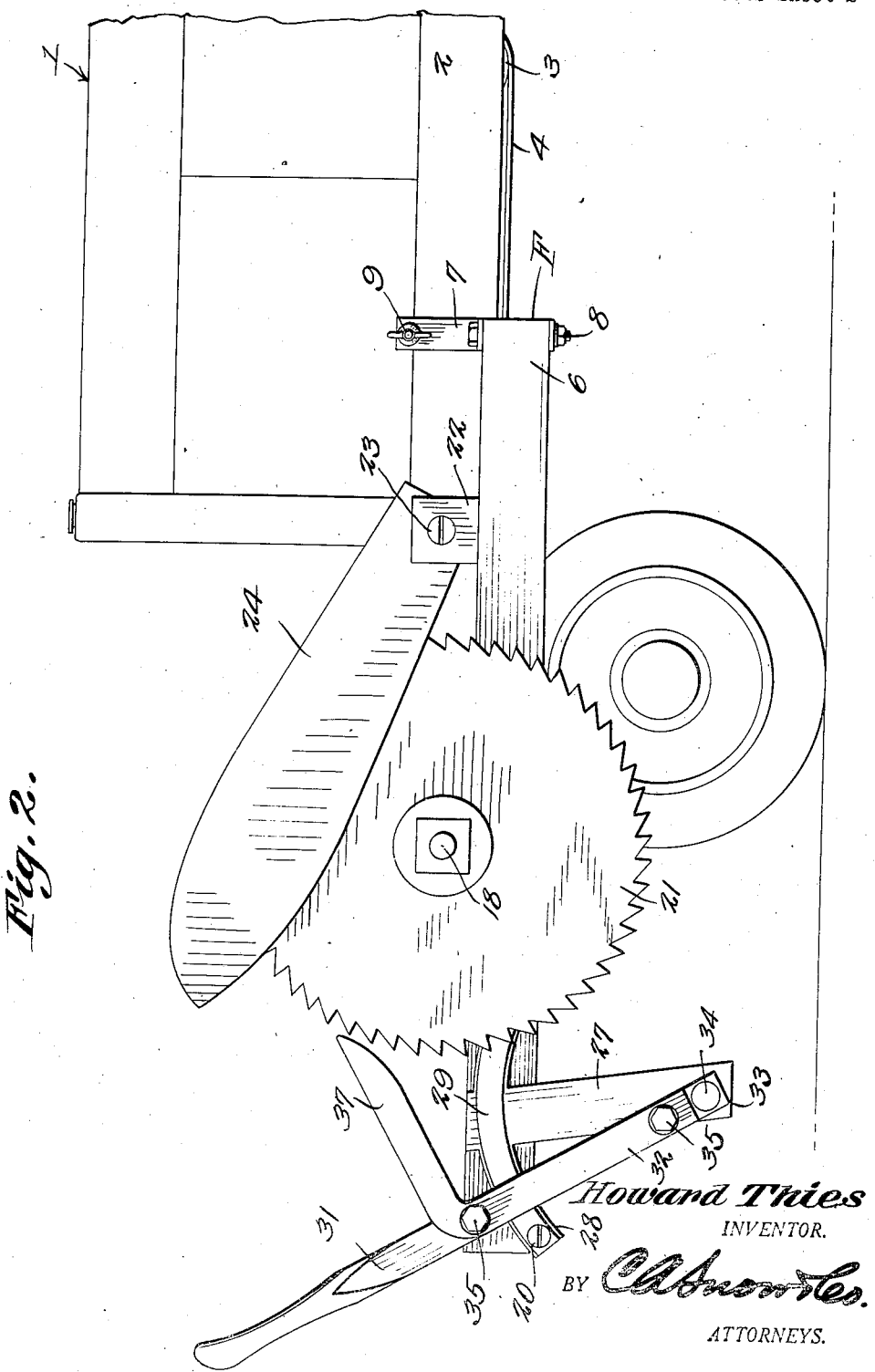

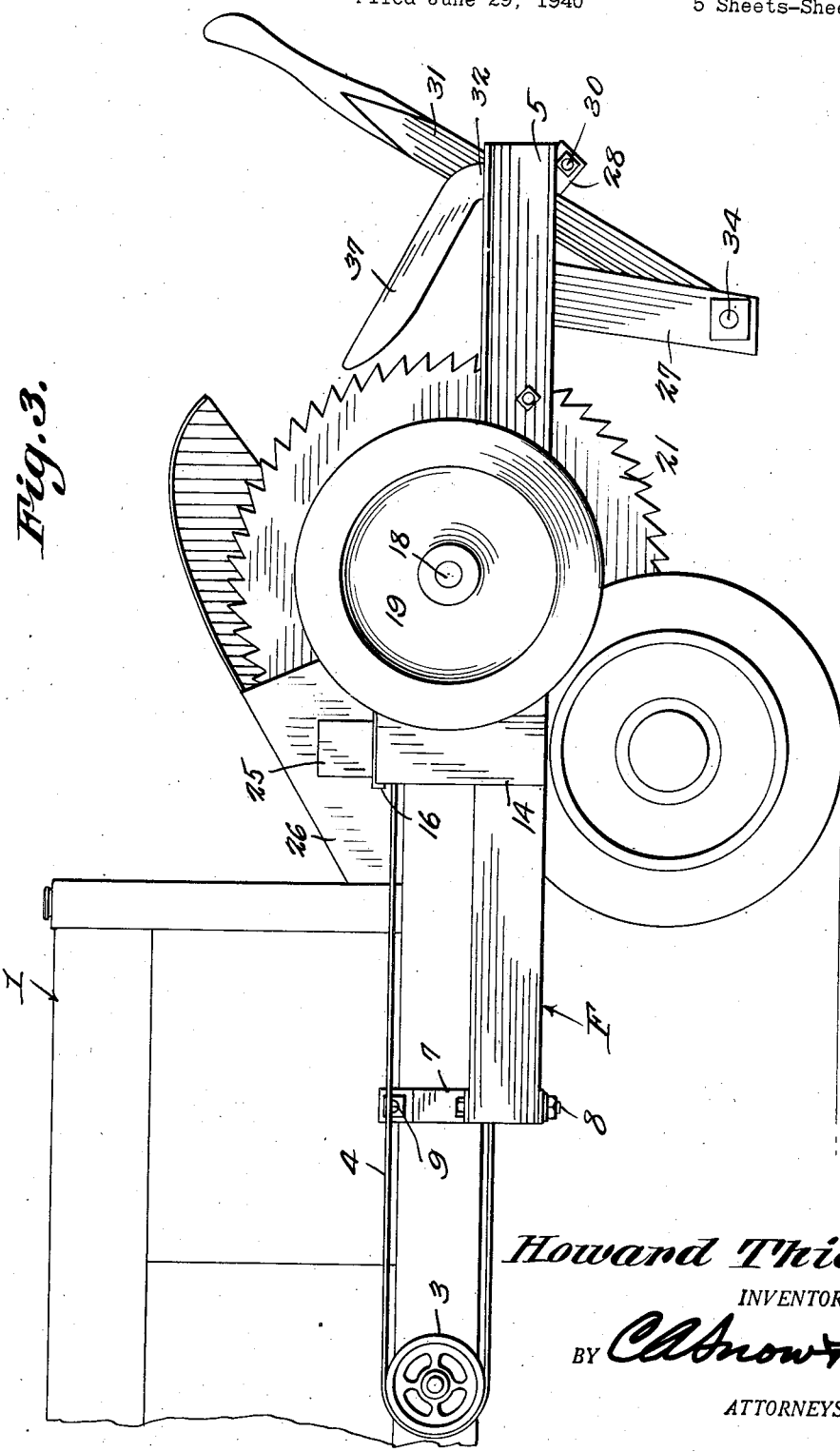

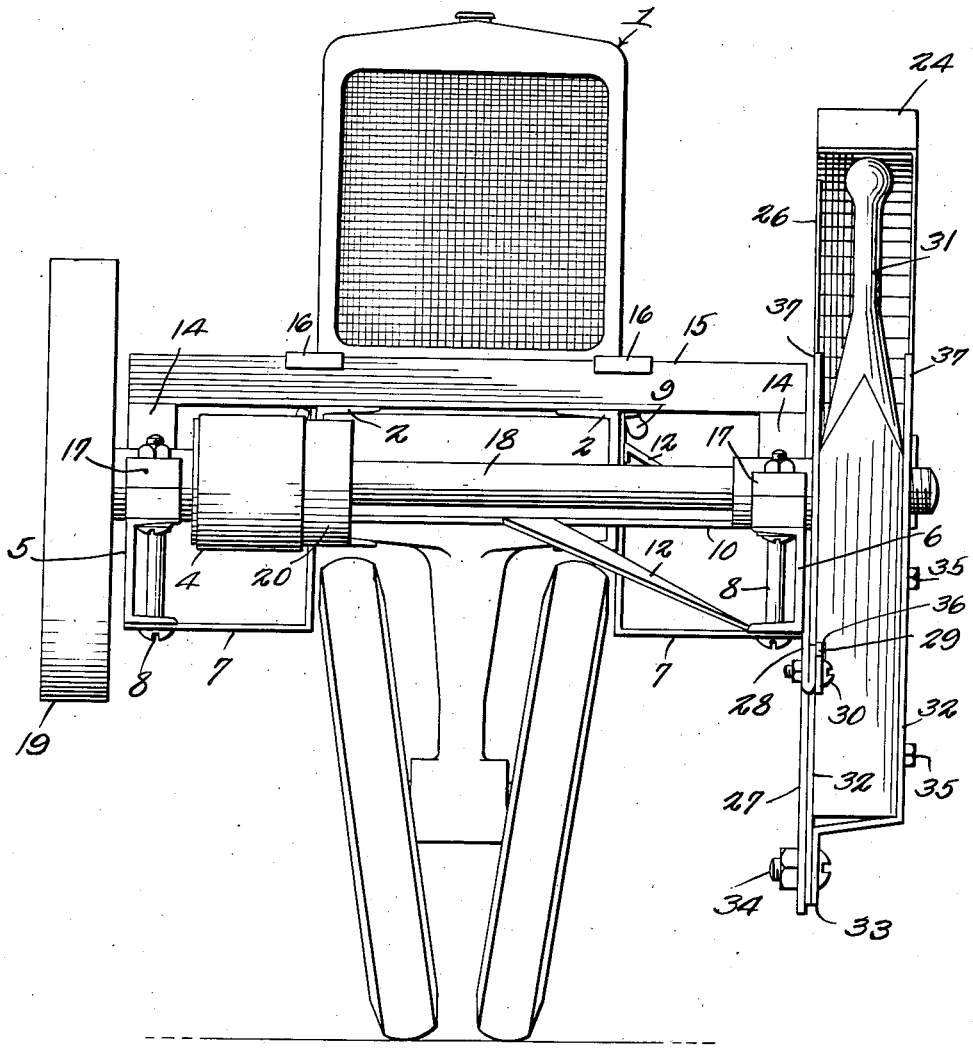

Jan. 6, 1942.     H. THIES     2,269,348
TRACTOR WOOD SAW
Filed June 29, 1940     5 Sheets-Sheet 5
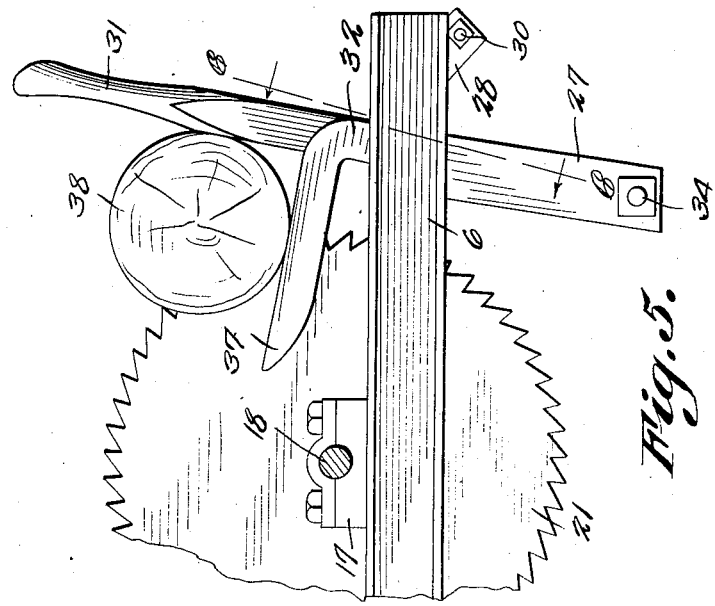
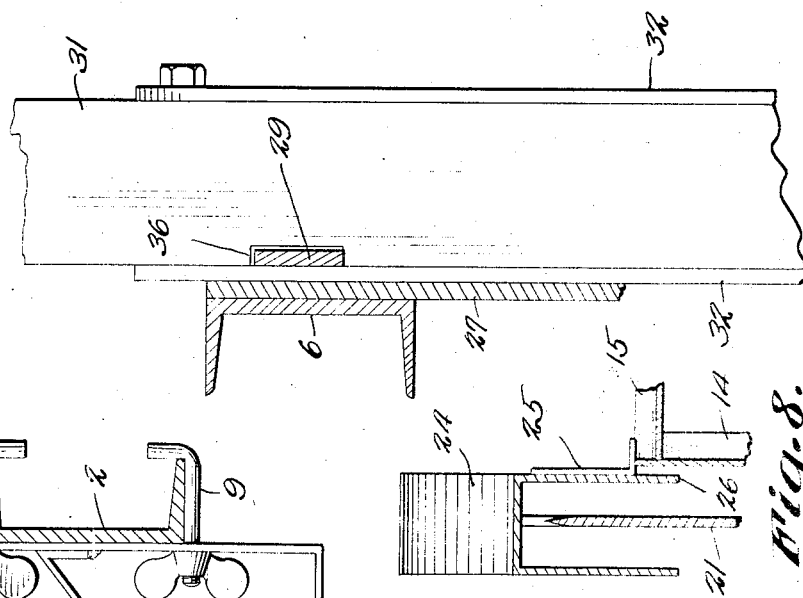
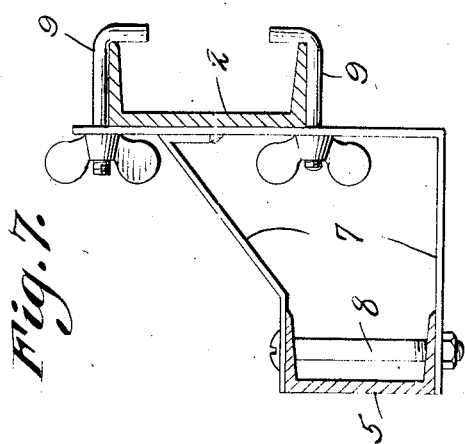
Howard Thies
INVENTOR.
BY
ATTORNEYS.

Patented Jan. 6, 1942

2,269,348

UNITED STATES PATENT OFFICE 2,269,348

TRACTOR WOOD SAW

Howard Thies, Caledonia, Minn.

Application June 29, 1940, Serial No. 343,299

1 Claim. (Cl. 143—43)

This invention aims to provide a novel device, adapted to be assembled with a tractor, and to be used for cutting wood.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in top plan, a device constructed in accordance with the invention;

Fig. 2 is a side elevation;

Fig. 3 is an elevation disclosing the opposite side of the device from that depicted in Fig. 2;

Fig. 4 is a front elevation;

Fig. 5 is an elevation showing the buzz saw and parts which cooperate with it;

Fig. 6 is a section on the line 6—6 of Fig. 5;

Fig. 7 is a fragmental cross section taken approximately on the line 7—7 of Fig. 1, parts being omitted;

Fig. 8 is a section taken on the line 8—8 of Fig. 1.

The numeral 1 marks a tractor, including parallel frame members 2, the tractor comprising a power driven pulley 3, for the operation of a belt 4.

A supporting frame F is provided, and includes rails 5 and 6, disposed parallel to the frame members 2, and outwardly thereof. Inwardly projecting transverse brackets 7 are held by securing elements 8 on the rails 5 and 6, the inner, upright portions of the brackets carrying hook bolts 9 engaging the frame members 2 of the tractor 1.

The rails 5 and 6 are joined together by a front cross piece 10. The cross piece 10 is connected to the rail 5 by an inclined brace 11, the cross piece being connected to the rail 6 by diverging braces 12.

Standards 14 are secured to the rails 5 and 6. A rear cross piece 15 is secured to the upper ends of the standards 14. The rear cross piece 15 rests on the frame members 2 of the tractor 1, as shown in Fig. 4, and the frame F is supported on the tractor parts 2. The rear cross piece 15 may be in the form of an elongated box, adapted to carry tools or the like. The cross piece 15 is strengthened and reenforced by transverse ties 16 assembled with the upstanding front and rear walls of the cross piece 15.

Bearings 17 are mounted on the rails 5 and 6, directly in advance of the cross piece 10. A transverse arbor 18 is journaled for rotation in the bearings 17. A fly wheel 19 is secured to one end of the arbor 18 and is located outwardly of the rail 5. Inwardly of the side rail 5, a pulley 20 is secured to the arbor 18, the pulley receiving the belt 4. The belt 4 extends through one of the brackets 7. A buzz saw 21 is secured to the arbor 18, and is located outwardly of the rail 6.

A bracket 22 is secured to the rail 6, abaft the rear cross piece 15. The bracket 22 carries a pivot element 23. On the pivot element 23, an inverted trough-shaped saw guard 24 is mounted for vertical swinging movement. There is a fixed stop 25 on the inner wing 26 of the saw guard. The stop 25 is adapted to come into contact with the rear cross bar 15, to limit the downward swinging movement of the saw guard.

A depending hanger 27 is secured to the outer surface of the rail 6. The hanger 27 has a curved head 28 disposed against the outer side of the rail 6. An offset arcuate guide 29 has its ends secured at 30 to the head 28.

The numeral 31 marks a hand lever, preferably made of wood. The lower part of the hand lever 31 is received between metal straps 32. The bottom parts of the straps 32 are brought together to form a tongue 33, mounted on a pivot element 34 carried by the lower part of the hanger 27. The straps 32 are attached by securing elements 35 to the hand lever 31. One of the side straps 32 passes between the guide 29 and the hanger 27, as shown in Fig. 6, the lever 31 having a recess 36, receiving the guide 29.

The straps 32 are backwardly extended, to form rectangularly disposed supports 37 for the piece of wood 38 that is to be sawed.

When the lever 31 carries the wood 38 against the saw 21, the wood is severed, the saw being rotated by a train of parts including the arbor 18, the pulley 20, the belt 4, and the power driven pulley 3 of the tractor 1.

The device is simple in construction, but it affords an efficient means whereby a wood sawing instrumentality may be assembled with a tractor, novel means being provided for carrying the wood into and out of engagement with the saw.

Having thus described the invention, what is claimed is:

A wood sawing mechanism comprising side rails, means for securing the rails to a tractor frame, a saw supported for rotation on one rail, a depending hanger mounted on one rail, a transverse guide on the hanger, a hand lever, straps secured directly to opposite sides of the lever, the upper portions of the straps being continued to form transversely projecting supports, the width of the lever being such that the supports will pass on opposite sides of the saw, in close relation thereto, the supports and the lever defining an angle for the reception of the wood to be sawed, one strap passing between the guide and the hanger, the lever being recessed to receive said guide, the lower ends of the straps being brought together below the lever, and a fulcrum element connecting the lower ends of the straps with the hanger.

HOWARD THIES.